United States Patent
Pozgainer et al.

(10) Patent No.: US 10,456,969 B2
(45) Date of Patent: Oct. 29, 2019

(54) NOZZLE FOR SHEET OR FILM EXTRUSION

(71) Applicant: MAGNA STEYR Fuel Systems GesmbH, Sinabelkirchen (AT)

(72) Inventors: Guenther Pozgainer, Graz (AT); Sandor Palvoelgyi, Gleisdorf (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 804 days.

(21) Appl. No.: 14/523,103

(22) Filed: Oct. 24, 2014

(65) Prior Publication Data
US 2015/0115498 A1 Apr. 30, 2015

(30) Foreign Application Priority Data
Oct. 25, 2013 (EP) .................................... 13190267

(51) Int. Cl.
| | | |
|---|---|---|
| B29C 48/30 | (2019.01) | |
| B29C 48/92 | (2019.01) | |
| B29C 48/31 | (2019.01) | |
| B29C 48/07 | (2019.01) | |
| B29C 48/08 | (2019.01) | |
| B29C 48/12 | (2019.01) | |

(52) U.S. Cl.
CPC .............. B29C 48/30 (2019.02); B29C 48/07 (2019.02); B29C 48/08 (2019.02); B29C 48/12 (2019.02); B29C 48/31 (2019.02)

(58) Field of Classification Search
None
See application file for complete search history.

(56) References Cited

U.S. PATENT DOCUMENTS

| | | | | |
|---|---|---|---|---|
| 6,475,414 B1* | 11/2002 | Gross | ................ | B29C 47/0021 |
| | | | | 264/167 |
| 2010/0143520 A1* | 6/2010 | Pinchot | ................ | A23N 17/005 |
| | | | | 425/142 |
| 2011/0129560 A1* | 6/2011 | Borchert | ............. | B29C 49/0047 |
| | | | | 425/522 |
| 2011/0287171 A1* | 11/2011 | Seo | ....................... | B05C 5/0262 |
| | | | | 427/8 |

FOREIGN PATENT DOCUMENTS

| | | |
|---|---|---|
| CN | 1058216 C | 11/2000 |
| CN | 201446681 U | 5/2010 |
| CN | 101466524 B | 7/2012 |
| DE | 19535930 C1 | 1/1997 |
| DE | 202007008132 U1 | 10/2007 |
| DE | 102007030369 A1 | 1/2009 |
| EP | 1112834 A1 | 7/2001 |
| JP | S5497663 A | 8/1979 |
| JP | S54153877 A | 12/1979 |
| JP | 2001009817 A | 1/2001 |
| WO | 93/06985 A1 | 4/1993 |

* cited by examiner

*Primary Examiner* — Jeffrey M Wollschlager
*Assistant Examiner* — Armand Melendez
(74) *Attorney, Agent, or Firm* — Jordan IP Law, LLC; Todd A. Vaughn

(57) ABSTRACT

A die and a method for producing a structural part from hardenable material by way of a die. The die includes a die bottom part; a die top part; a die control unit; a flexible element extending along a lower edge of the die top part; and at least one adjusting bolt to adjust at least partially, via the die control unit, a spatial distance between the flexible element and the die bottom part during extrusion.

15 Claims, 6 Drawing Sheets

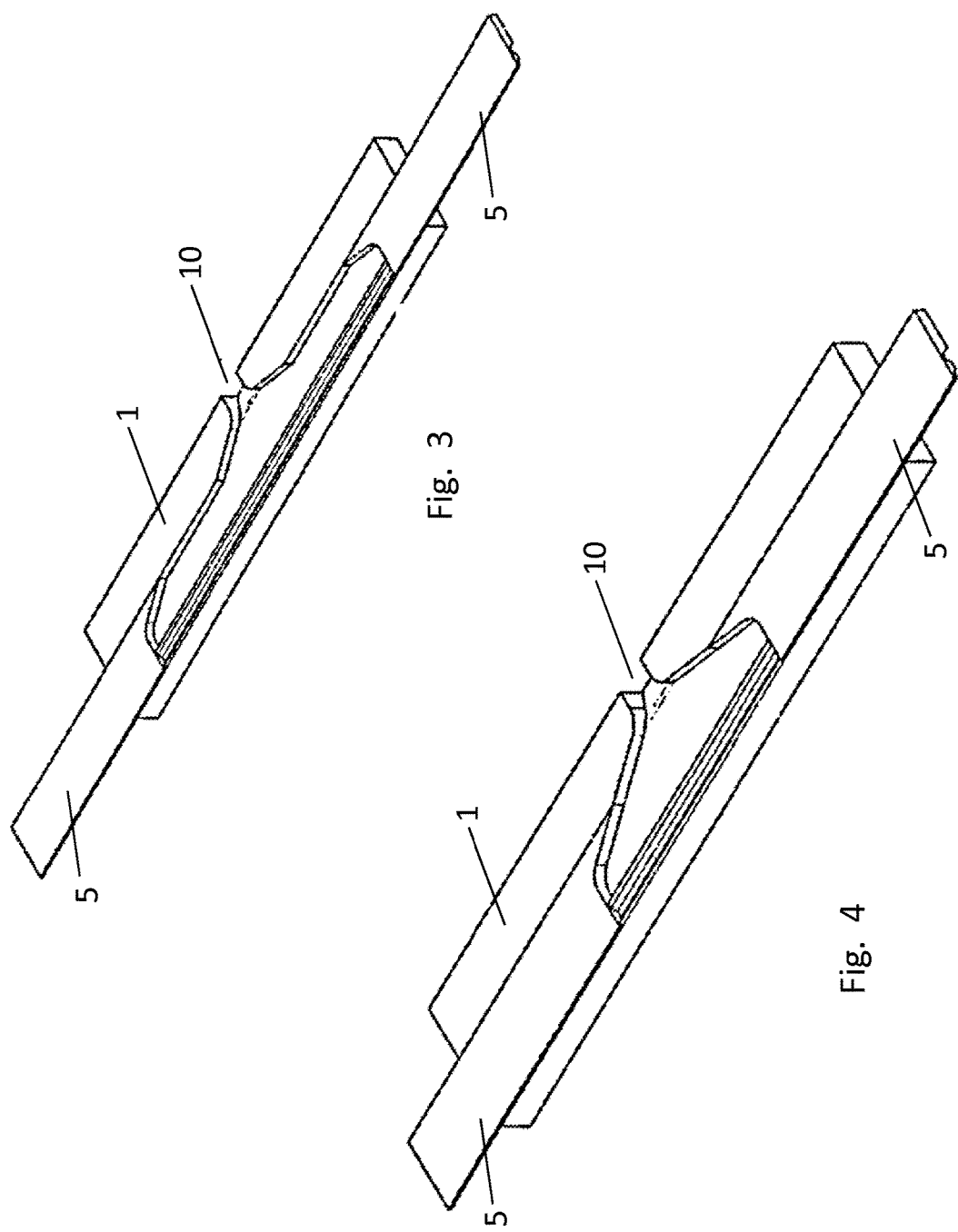

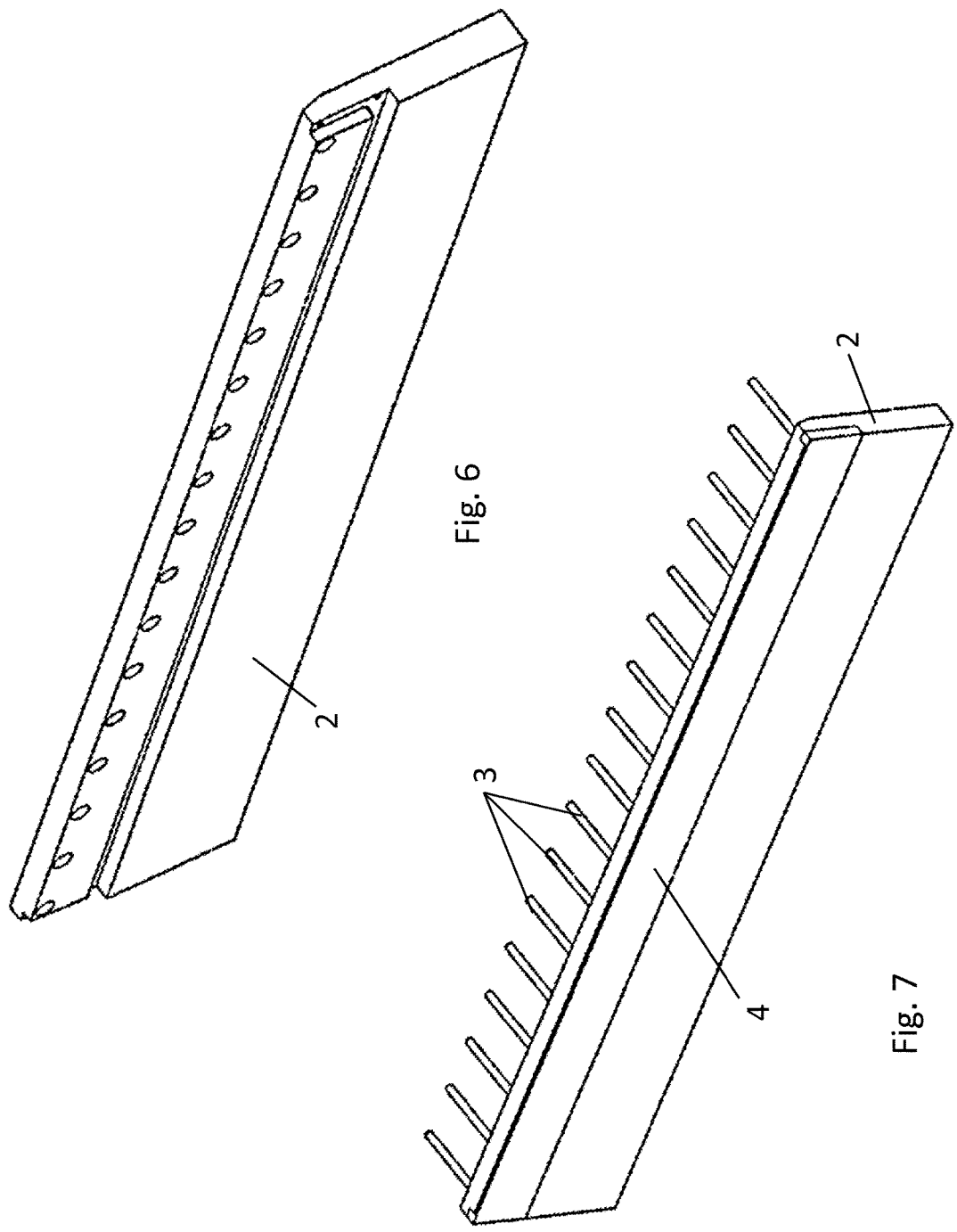

NOZZLE FOR SHEET OR FILM EXTRUSION

CROSS-REFERENCE TO RELATED APPLICATIONS

The present application claims priority 35 U.S.C. § 119 to European Patent Publication No. EP 13190267.8 (filed on Oct. 25, 2013), which is hereby incorporated by reference in its entirety.

TECHNICAL FIELD

Embodiments relate to a die for a board or film extrusion of a hardenable material, in particular, for the extrusion of plastic boards. Embodiments also relate to a method for producing a structural part from hardenable material by way of such a die.

BACKGROUND

Dies for a board or film extrusion of plastic and other plasticizable and hardenable materials are known per se. The material is conventionally first heated and pressed in the plastic state through the die between a die bottom part and a die top part, in order, after a cooling and hardening phase, to obtain a board which conforms as exactly as possible to stipulated dimensions.

It is also known, for example from U.S. Pat. No. 4,454,084 or German Patent Publication No. DE 198 55 751 A1, that the thickness of the die, that is to say the distance between a die bottom part and a die top part, may be finely set before extrusion, in order to adhere to stipulated thickness tolerances.

Furthermore, the processing of plastic boards by thermo forming is known, in which thermoplastics are conventionally formed in the heated state, for example, deep-drawn in a vacuum.

SUMMARY

Embodiments relate to enhanced dies of the type mentioned hereinabove, such that a larger bandwidth of different boards or films may be produced by extrusion and, in particular, the boards or films produced are better suited to processing by way of further forming processes, such as thermo forming.

Embodiments relate to a suitable method for producing a structural part from hardenable material by way of such a die.

In accordance with embodiments, a die for a board or film extrusion of a hardenable material, comprises at least one of: a die bottom part, a die top part, at least one adjusting bolt, a die control unit, a flexible element extending along the lower edge of the die top part, the distance between the flexible element and the die bottom part being adjustable at least partially during extrusion by the die control unit by way of the at least one adjusting bolt.

In accordance with embodiments, a flexible element is arranged at the lower edge of the die top part, such that the distance of the said flexible element from the die bottom part determines the gap of the die. The flexible element is a flexible lip of the die, which lip extends at least over a substantial part of the width of the die, preferably over the entire width of the die which may be used for extrusion. At least in a segment along this extent of the flexible element, the latter may be pressed nearer to the die bottom part and/or may be moved away from the die bottom part at least by way of a bolt during the extrusion operation. What is achieved thereby is that the thickness of a board or film which is produced by way of the die may vary along its longitudinal direction, that is to say, the extrusion direction. In addition, as a result of the partial action of the adjusting bolt upon the flexible element, the thickness of the board or film may also vary in the transverse direction, perpendicularly to the extrusion direction.

In accordance with embodiments, the die control unit is designed such that adjustment of the adjusting bolts is possible during extrusion.

Developments of embodiments are specified in the dependent claims, the description and the accompanying drawings.

In accordance with embodiments, a die comprises at least one of: a die bottom part; a die top part; a die control unit; a flexible element extending along a lower edge of the die top part; and at least one adjusting bolt to adjust at least partially, via the die control unit, a spatial distance between the flexible element and the die bottom part during extrusion.

In accordance with embodiments, a die comprises at least one of: a die bottom part; a die top part; a die control unit; a flexible element extending along a lower edge of the die top part; and a plurality of adjusting bolts to adjust, via the die control unit, a spatial distance between the flexible element and the die bottom part in a plurality of segments during extrusion.

In accordance with embodiments, a method for producing a structural part from a hardenable material, the method comprising at least one of: providing a die having a die bottom part; a die top part; a die control unit; a flexible element extending along a lower edge of the die top part; and at least one adjusting bolt to adjust at least partially, via the die control unit, a spatial distance between the flexible element and the die bottom part during extrusion; and varying, during extrusion, the thickness of the structural part in at least one of a longitudinal direction and a transverse direction via the die control unit.

In accordance with embodiments, the distance between the flexible element and the die bottom part may be adjusted during extrusion by the die control unit by the amount of at least one of 0.5 mm, 1 mm and 2 mm. The specified distances refer to the lower edge of the flexible element and the upper edge of the lower die half. A marked change in the thickness of the boards produced may thereby be achieved during extrusion.

In accordance with embodiments, the die may comprise a plurality of adjusting bolts which act upon the same flexible element, so that the distance between the flexible element and the die bottom part may be adjusted in a plurality of segments during extrusion by the die control unit by way of the plurality of adjusting bolts. As a result, the thickness of the board produced may also be set differently in various segments transversely to the extrusion direction. Also, an approximately homogeneous pressure may thereby be exerted on the flexible element along the transverse direction.

In accordance with embodiments, a slide may be arranged, spatially below the flexible element for setting the width of the die, laterally on the die, that is to say on the left and right, in each case. As a result, the width of the boards produced may be varied before extrusion or even during extrusion. The lateral slides may likewise be activated by the die control unit.

In accordance with embodiments, lateral adjusting bolts press the flexible element permanently onto the slides and thereby ensure sealing-off between the flexible element and die bottom part in the side region. Only the middle adjusting bolts may then actually be adjusted during extrusion.

In accordance with embodiments, a method for producing a structural part from hardenable material uses such a die, during extrusion the thickness of the structural part being varied in the longitudinal direction and/or in the transverse direction by the die control unit, in that, during extrusion, the distance between the flexible element and the die bottom part is varied at least partially by the die control unit by way of the at least one adjusting bolt. In particular, the distance between the flexible element and the die bottom part may be varied by the die control unit two-dimensionally, to be precise as a function of the position in the transverse direction and of time.

In accordance with embodiments, to produce the structural part, the distance between the flexible element and the die bottom part is varied by the die control unit in accordance with a first two-dimensional function, and, to produce a additional structural part, the distance between the flexible element and the die bottom part is varied by the die control unit in accordance with a second two-dimensional function different from the first two-dimensional functions. As a result, in particular, two structural parts coordinated with one another may be produced by way of a single die and die control unit.

The structural part and the additional structural part may, in particular, be welded to one another at their circumferences, in order jointly to form a container. In this case, the structural part and the additional structural part form a bottom shell and a top shell, in particular for a plastic container.

For this purpose, preferably, the first two-dimensional function and the second two-dimensional function are linked to one another in such a way that the circumferences of the two structural parts fit one on the other, so that they may easily be welded to one another. The linking of the two two-dimensional functions may be in the form of a tensor.

In accordance with embodiments, before the production of the structural part and of the additional structural part, a link between the first two-dimensional function and the second two-dimensional function, in particular a tensor, is configured on the die control unit.

The method in accordance with embodiments may be employed especially effectively when, after the extrusion of the structural part, the latter is thermoformed, in particular the regions which are thicker after extrusion being thinned to a greater extent during thermoforming. In this case, as a result of the variations in thickness during extrusion, the different thickness variations may be compensated, for example, by way of a different amount of deep-drawing.

DRAWINGS

Embodiments will be illustrated by way of example in the drawings and explained in the description below.

FIGS. 3 and 4 respectively illustrate perspective views of a die bottom part with lateral slides.

Figure 5:
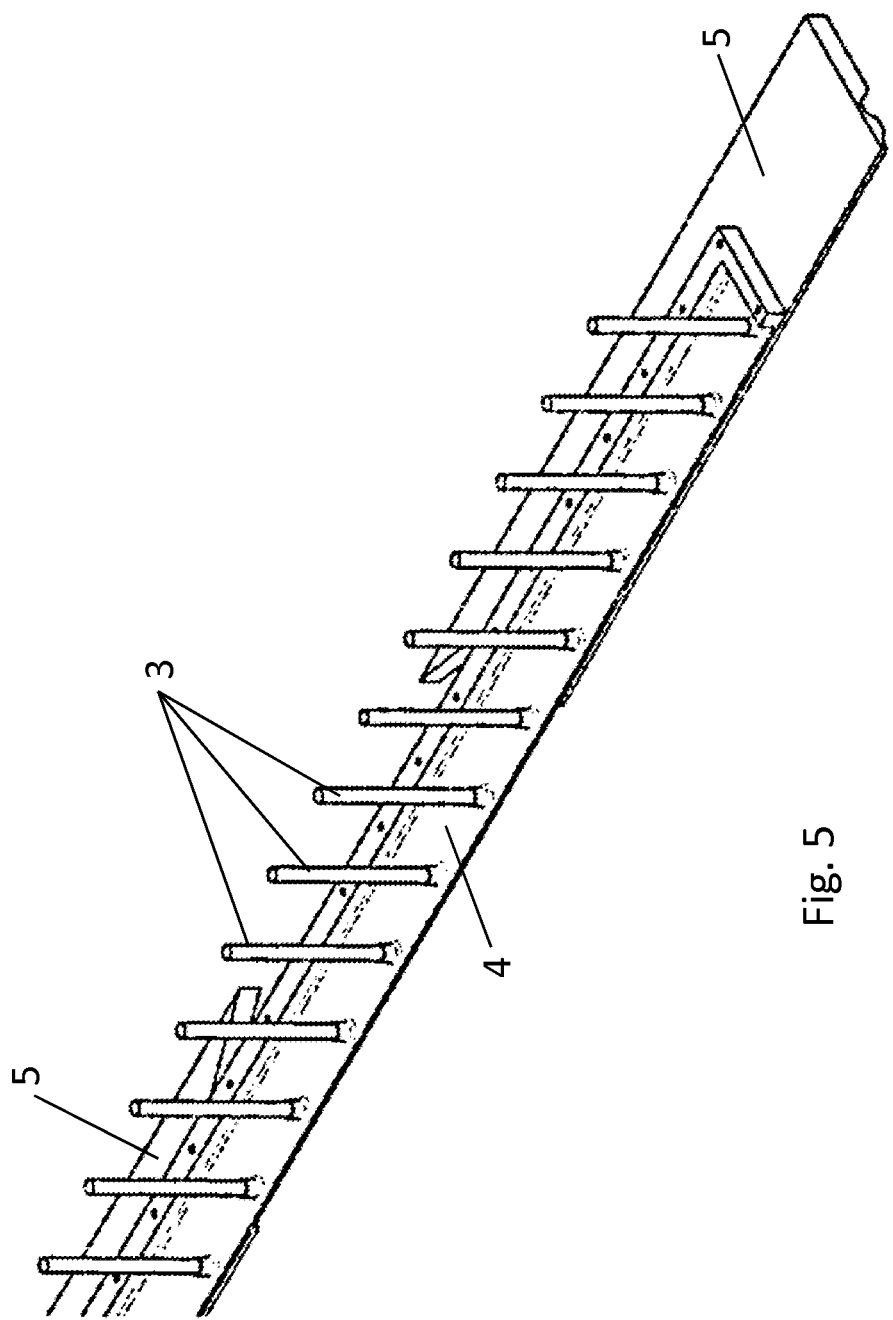

FIG. 5 illustrates a top view of an elastic element with adjusting bolts, without a die top part, in accordance with embodiments.

FIG. 6 illustrates a perspective view of a die top part without an inserted elastic element, in accordance with embodiments.

FIG. 7 illustrates a perspective view of a die top part with an inserted elastic element, in accordance with embodiments.

Figure 8:
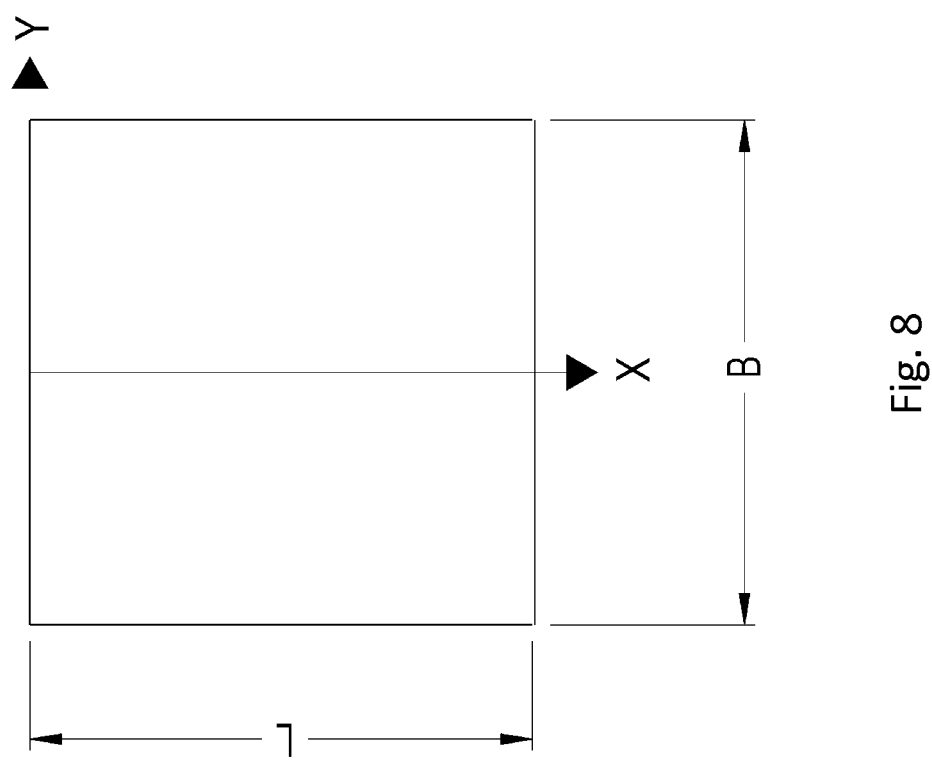

FIG. 8 illustrates an extruded board in a coordinate system X, Y, in accordance with embodiments.

DESCRIPTION

Figure 1:
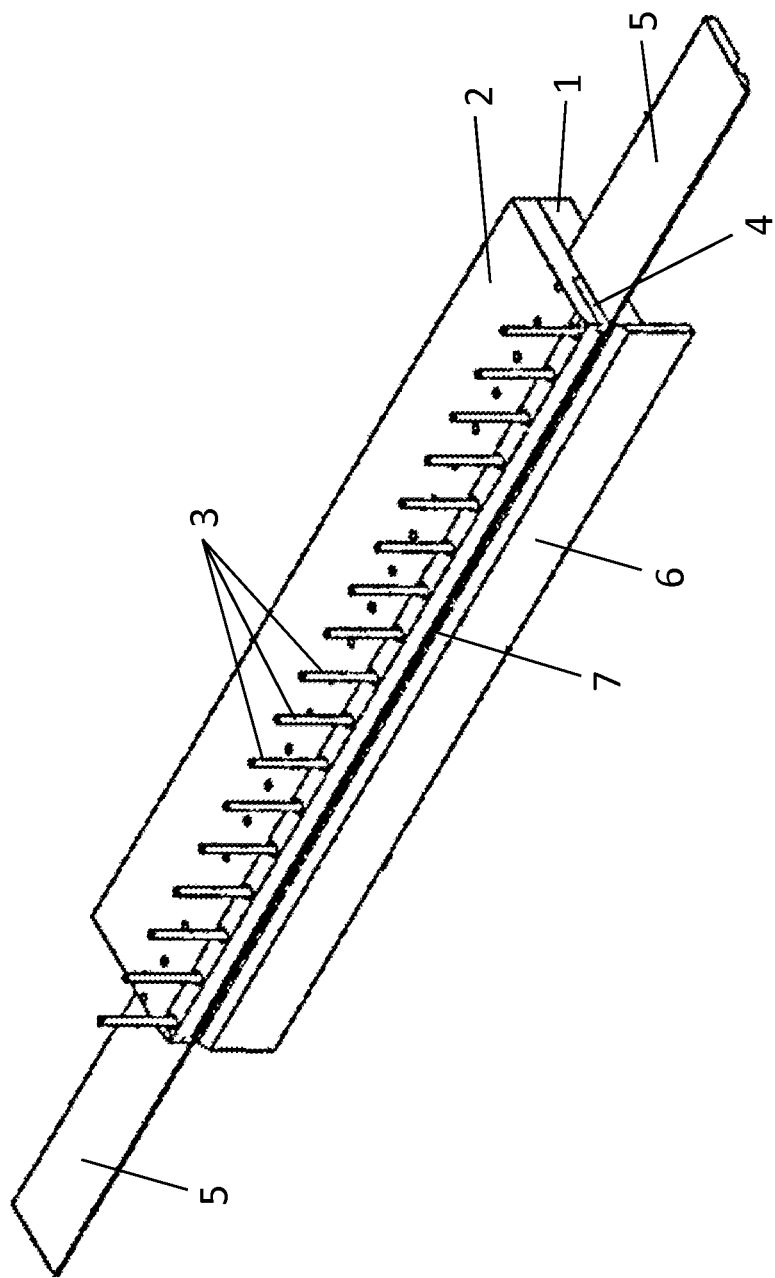
FIG. 1 illustrates a perspective view of a die, in accordance with embodiments.

FIG. 1 illustrates a die in accordance with embodiments for the board or film extrusion of a hardenable material, with a die bottom part 1 and a die top part 2. Along the lower edge of the die top part 2 extends a flexible element 4 which forms a flexible lip, so that a die outlet 7 is formed between the flexible element 4 and the die bottom part 1. Mounted in front of the die outlet 7 is a blocking slide 6, by way of which an extruded board may be cut off. A plurality of adjusting bolts 3 are led from above through the die top part 2 and connected to the flexible element 4. The adjusting bolts 3 may be actuated via a die control unit (not illustrated). When the adjusting bolts 3 are moved in upward or downward direction relative to the die top 2 and die bottom 1, the flexible element 4 is likewise adjusted upwards or downwards in a segment adjacent to the respective adjusting bolt 3, so that the distance between the flexible element 4 and die bottom part 1 is varied at least in this segment. Actuators for the adjusting bolts 3, slides 5 and blocking slides 6 are not illustrated in the figures for the sake of greater clarity.

Figure 2:
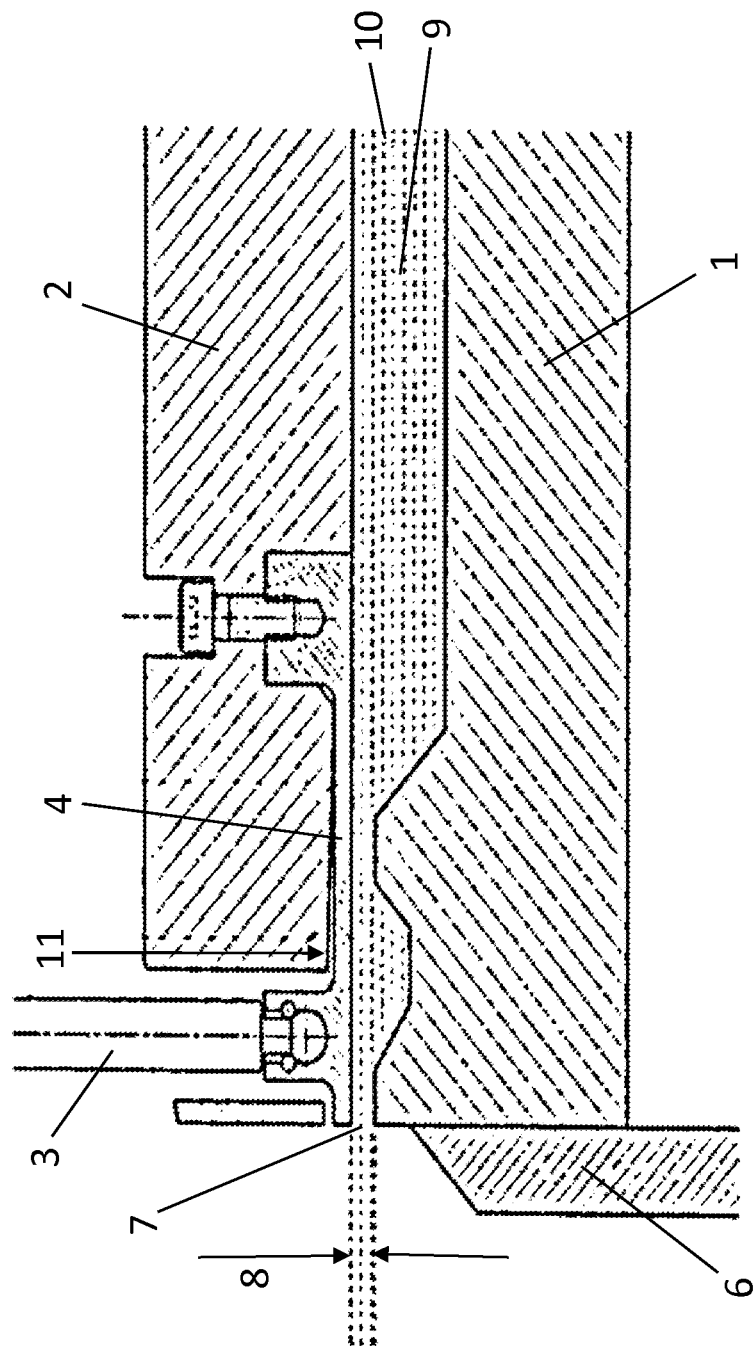
FIG. 2 illustrates a side view of the cross section through the die of FIG. 1.

FIG. 2 is an illustration of the cross-section through the die of FIG. 1. The melt 9, in particular molten plastic, enters the die at the rear through a die inlet duct 10 and is pressed through a duct which is formed first between the die top part 2 and die bottom part 1. The die bottom part 1 has a flow-optimized shape. The elastic element 4 is fastened to the die top part 2 on the front side, facing the die outlet 7, of the die. The elastic element 4 has a movement free space 11 between and defined by the die top part 2 and die bottom part 1. An adjusting bolt 3 is led through a round hole in the die top part 2 and is fastened to the elastic element 4 in such a way that force may be transmitted to the elastic element 4 both upwards and downwards. The elastic element 4 remains elastic even under deformation. Finally, the melt 9 emerges from the die at a die outlet 7 in a desired thickness 8 which is determined by the distance between the die bottom part 1 and elastic element 4. The blocking slide 6 is also movable vertically at the die outlet 7.

FIGS. 3 and 4 are in each case illustrations of a die bottom part 1 with two lateral slides 5 in each case. The slides 5 are set as wide as possible in FIG. 3 and as narrow as possible in FIG. 4. The slides 5 are fitted exactly into the die bottom part 1, so that melt may not emerge between the die bottom part 1 and slide 5.

FIG. 5 is a top view illustration of the elastic element 4, on the pushed-together slides 5. The die top part is not illustrated here. During operation, the lateral adjusting bolts 3 arranged above the slides 5 press the elastic element 4 constantly against the slides 5 in order to bring about leak-tightness there. The remaining, middle adjusting bolts 3 may control the thickness of the extruded boards.

FIG. 6 is a bottom view illustration of the die top part from below, with a nest for inserting an elastic element. FIG. 7 illustrates the same view as FIG. 6, but with an inserted elastic element 4 and with adjusting bolts 3.

FIG. 8 illustrates an extruded board with a coordinate system X, Y, in order to explain in more detail the two-dimensional method for producing a structural part. The structural part illustrated has a length L along the extrusion direction X and the width B in the transverse direction X thereto. The local thickness of the structural part at a position x,y is given by a two-dimensional constant function $d(x,y) = d0+z(x,y)$, d0 being a nominal thickness and $z(x,y)$ being the thickness changes as a two-dimensional function. In the case of an extrusion speed v, what is obtained for a position along the extrusion length L, in dependence on the time t, as a thickness change function on the elastic element is $z0(t, y)=z(L-v*t, y)$. This thickness change function is preferably configurable on the die control unit. In the production of a container from two extruded boards which are subsequently welded to one another at their circumference, the two boards may fulfil different thickness functions, that is to say $d1(x,y)=d10+z1(x,y)$ and $d2(x,y)=d20+z2(x,y)$.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Die bottom part
2 Die top part
3 Adjusting bolt
4 Flexible element
5 Slide
6 Blocking slide
7 Die outlet
8 Thickness
9 Melt
10 Die inlet duct
11 Movement free space
L Length
B Width
X X axis
Y Y axis

What is claimed is:

1. A method for producing a container, the method comprising: providing a die that includes a die bottom part, a die top part, a flexible element extending between the die bottom part to define a die outlet between the flexible element and the die bottom part, outer slides arranged laterally on the die, a blocking slide arranged below the flexible element and which is moveable in a vertical direction relative to the die outlet, and a plurality of adjustment bolts connected to the flexible element and which are adjustably moveable, the adjustment bolts including outer adjustment bolts and middle adjustment bolts arranged between the outer adjustment bolts; producing a first structural part and a second structural part, each composed of an extrusion material, by:

initiating an extrusion process for the extrusion material;

forming, during the extrusion, a seal at lateral regions of the die by pressing only the outer adjustment bolts downward to thereby press the flexible element against the lateral slides without adjusting the middle adjustment bolts;

controlling, after forming the seal and during extrusion, the thickness of the extrusion material in a longitudinal direction and a transverse direction by adjusting only the middle adjustment bolts to thereby adjust a spatial distance between the flexible die element and the die bottom part;

cutting the extrusion material at the die outlet via the blocking slide; and forming the container by connecting the first structural part and the second structural part at their respective circumferences.

2. The method of claim 1, wherein:

for the first structural part, controlling the thickness of the extrusion material comprises adjusted the thickness of the extrusion material in accordance with a first two-dimensional function related to time and a transverse position of the extrusion material; and for the second structural part, controlling the thickness of the extrusion material comprises adjusted the thickness of the extrusion material in accordance with a second two-dimensional function related to time and a transverse position of the extrusion material, the second two-dimensional function being different than the first two-dimensional function.

3. The method of claim 1, wherein controlling the thickness of the extrusion material comprises adjusting the spatial distance between the flexible element and the die bottom part by an amount of at least 0.5 mm.

4. The method of claim 1, wherein controlling the thickness of the extrusion material comprises adjusting the spatial distance between the flexible element and the die bottom part by an amount of at least 1 mm.

5. The method of claim 1, wherein controlling the thickness of the extrusion material comprises adjusting the spatial distance between the flexible element and the die bottom part by an amount of at least 2 mm.

6. A method for producing a container composed of an extrusion material, the method comprising: providing a die that includes a die bottom part, a die top part, a flexible element extending between the die bottom part to define a die outlet between the flexible element and the die bottom part, a pair of lateral slides arranged laterally on the die, a blocking slide arranged below the flexible element and which is moveable, and a plurality of adjustably moveable adjustment bolts connected to the flexible element, the adjustment bolts including outer adjustment bolts and middle adjustment bolts arranged between the outer adjustment bolts; producing a first structural part and a second structural part, respectively by:

initiating an extrusion process for the extrusion material;

forming, during the extrusion, a seal at lateral regions of the die by pressing only the outer adjustment bolts downward to thereby press the flexible element against the lateral slides without adjusting the middle adjustment bolts;

controlling, after forming the seal and during extrusion, the thickness of the extrusion material by adjusting a spatial distance between the flexible die element and the die bottom part via an adjustment of only the middle adjustment bolts;

producing the first structural part and the second structural part, respectively, by cutting the extrusion material at the die outlet via the blocking slide; and connecting the first structural part and the second structural part at their respective circumferences.

7. The method of claim 6, wherein, for the first structural part, the thickness of the extrusion material is adjusted in accordance with a two-dimensional function related to time and a transverse position of the extrusion material.

8. The method of claim 7, wherein, for the second structural part, the thickness of the extrusion material is adjusted in accordance with a second two-dimensional function related to time and a transverse position of the extrusion material, the second two-dimensional function being different than the first two-dimensional function.

9. The method of claim 8, further comprising operatively linking the first two-dimensional function and the second two-dimensional function to one another, in the form of a tensor, in such a way that respective circumferences of the first structural part and the second structural part correspond to each other.

10. The method of claim 8, further comprising, before producing the first structural part and the second structural part, configuring a tensor between the first two-dimensional function and the second two-dimensional function.

11. The method of claim 8, further comprising, after producing the first structural part and the second structural part, thermoforming the first structural part and the second structural part in regions thereof which are thicker after extrusion.

12. The method of claim 6, wherein controlling the thickness of the extrusion material comprises adjusting the spatial distance between the flexible element and the die bottom part by an amount of at least 0.5 mm.

13. The method of claim 6, wherein controlling the thickness of the extrusion material comprises adjusting the spatial distance between the flexible element and the die bottom part by an amount of at least 1 mm.

14. The method of claim 6, wherein controlling the thickness of the extrusion material comprises adjusting the spatial distance between the flexible element and the die bottom part by an amount of at least 2 mm.

15. A method for producing a structural part composed of an extrusion material, the method comprising: providing a die that includes a die bottom part, a die top part, a flexible element extending between the die bottom part to define a die outlet between the flexible element and the die bottom part, a pair of lateral slides arranged laterally on the die, a moveably arranged blocking slide arranged below the flexible element, and a plurality of adjustment bolts connected to the flexible element and which are adjustably moveable, the adjustment bolts including outer adjustment bolts and middle adjustment bolts arranged between the outer adjustment bolts;

initiating an extrusion process for the extrusion material;

forming, during the extrusion, a seal at lateral regions of the die by pressing only the outer adjustment bolts downward to thereby press the flexible element against the lateral slides without adjusting the middle adjustment bolts;

controlling, after forming the seal and during extrusion, the thickness of the extrusion material by adjusting a spatial distance between the flexible die element and the die bottom part via an adjustment of only the middle adjustment bolts;

and cutting the extrusion material at the die outlet via the blocking slide, wherein the thickness of the extrusion material is adjusted in accordance with a two-dimensional function related to time and a transverse position of the extrusion material.

* * * * *